United States Patent
MacKelvie

[11] Patent Number: 5,845,992
[45] Date of Patent: Dec. 8, 1998

[54] TIRE TUBE CONTAINER AND TUMBLER

[76] Inventor: Winston Richard MacKelvie, Box 1156, Knowlton, Quebec, Canada, J0E 1V0

[21] Appl. No.: 753,272

[22] Filed: Nov. 22, 1996

Related U.S. Application Data

[60] Provisional application No. 60/007,530 Nov. 24, 1995.

[51] Int. Cl.[6] ............................... B65D 6/00; B01F 9/02
[52] U.S. Cl. ...................... 366/226; 366/225; 366/220; 52/DIG. 9; 222/4.04; 222/4.26
[58] Field of Search ...................... 366/219, 220, 366/225, 226, 234; 52/DIG. 9; 119/61, 54; 220/4.04, 4.26; 451/328; 241/137, 153, 179

[56] References Cited

U.S. PATENT DOCUMENTS

| | | | |
|---|---|---|---|
| 3,621,611 | 11/1971 | Wingerter | 52/DIG. 9 |
| 3,764,446 | 10/1973 | Martin | 52/DIG. 9 |
| 3,848,853 | 11/1974 | Way et al. | 52/DIG. 9 |
| 4,364,335 | 12/1982 | Livingston | 119/61 |
| 5,267,662 | 12/1993 | Hayes | 52/DIG. 9 |
| 5,626,096 | 5/1997 | Sibley | 119/61 |

FOREIGN PATENT DOCUMENTS

| | | | |
|---|---|---|---|
| 25 52 320 | 6/1977 | Germany | 52/DIG. 9 |

Primary Examiner—Tony G. Soohoo

[57] ABSTRACT

A novel container called a tire tube is made from whole, used tires. They are first turned inside out or inverted. Several tire tubes may be connected together side by side with holes aligned sing fasteners such as screws. With the ends sealed the tire tube may be used as a container for toxic substance storage, or sand to act as a highway bumper. With the ends left open the tire tube may be used as a conduit, or a culvert. Supported to allow rotation at a slight angle to the horizontal and with the higher end being fed material, the rotating tire tube tumbles the material to the exit end. With rock added, the result of tumbling is a pulverizing action. By adding organic material and keeping it moist the rotating tire tube becomes a continuous-action composter.

9 Claims, 6 Drawing Sheets

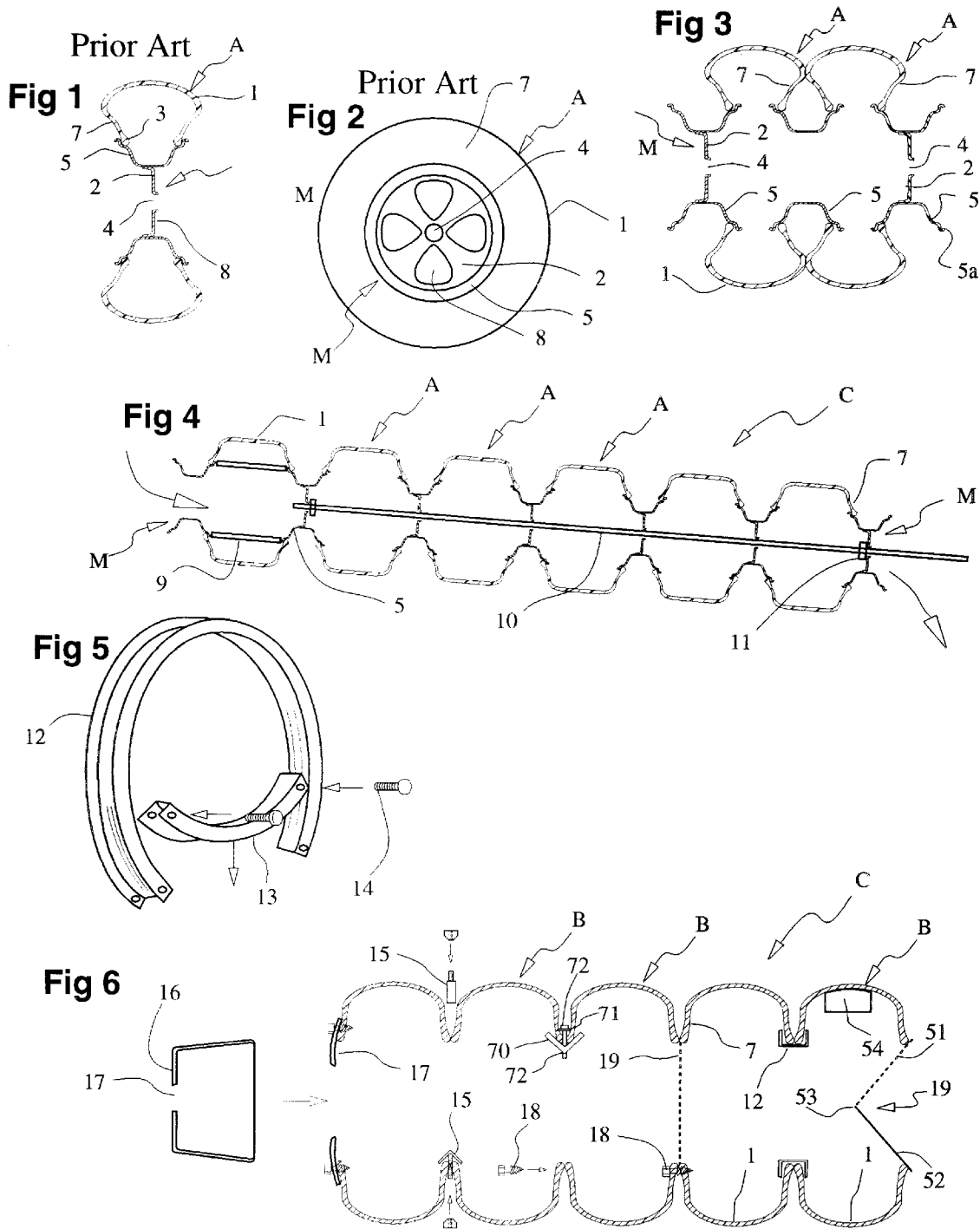

Fig 7
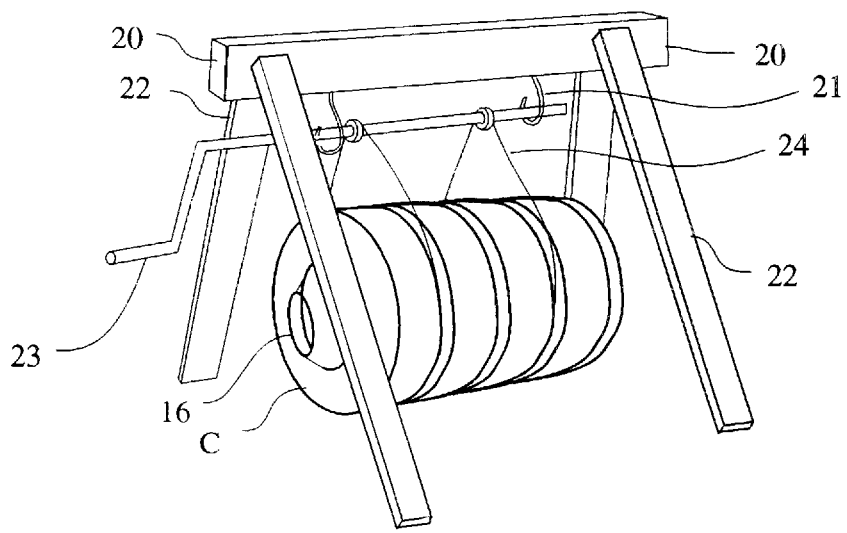
Fig 8
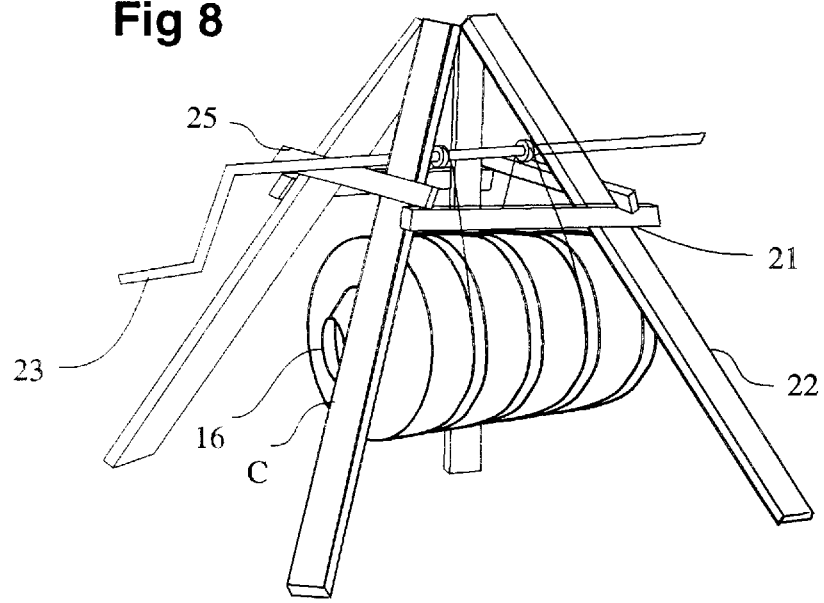

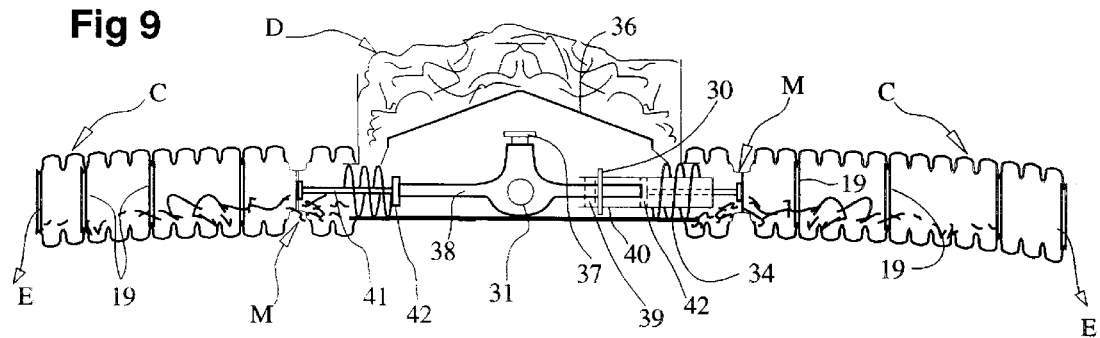
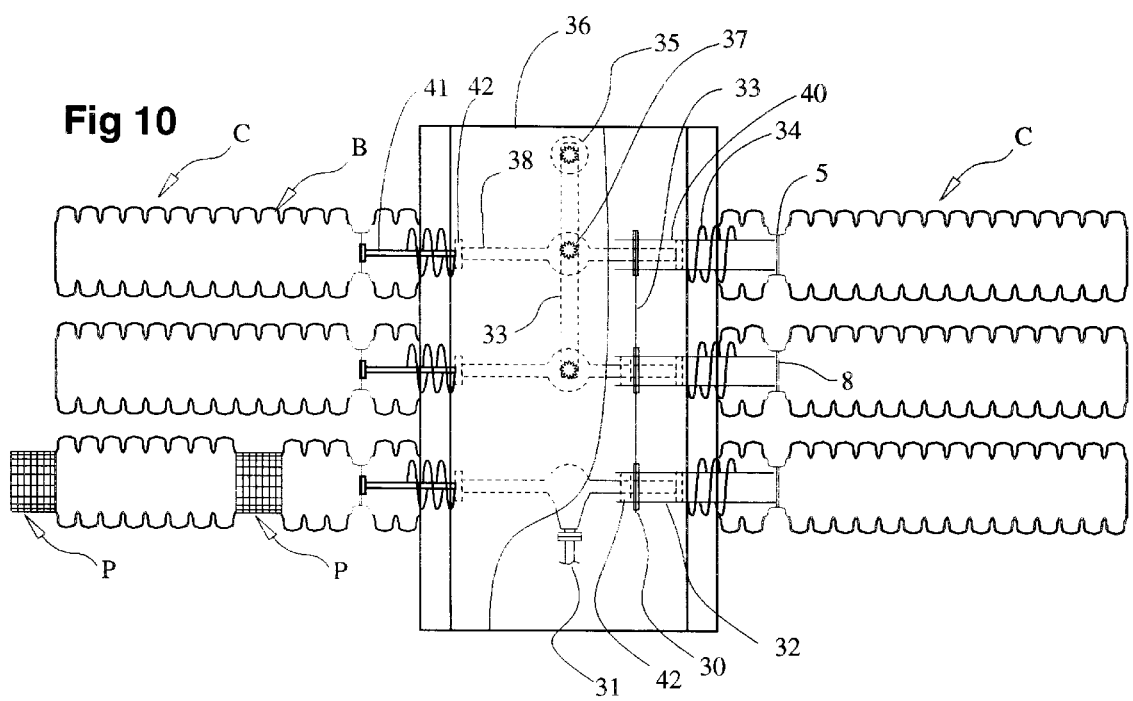
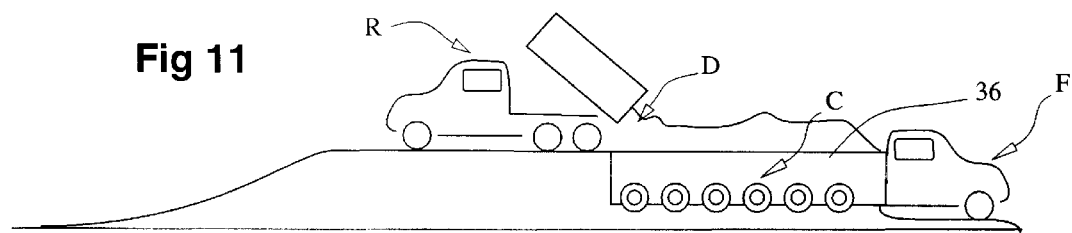

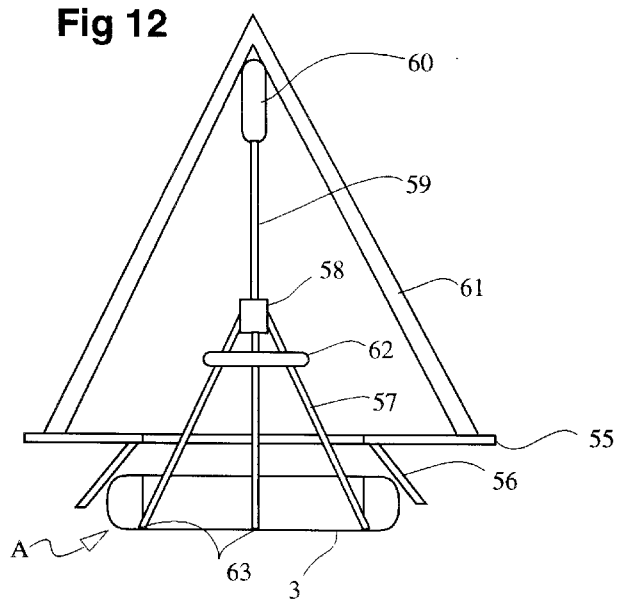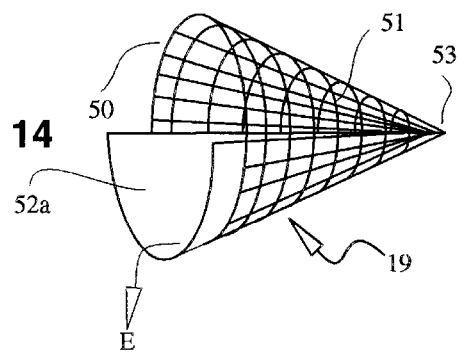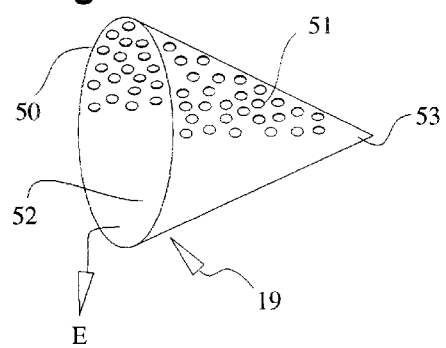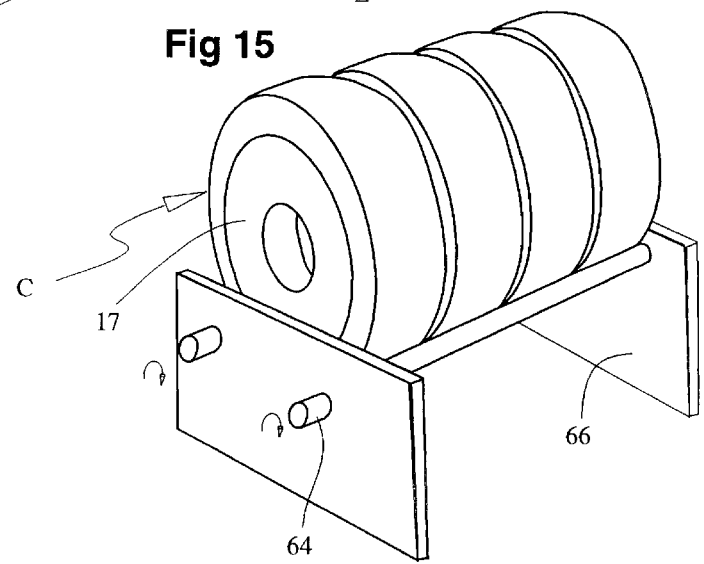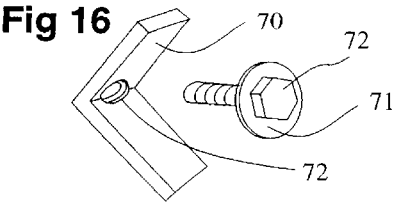

TIRE TUBE CONTAINER AND TUMBLER

This application is a provisional of Ser. No. 60/007,530 filed Nov. 24, 1995.

BACKGROUND

It is well known that the accumulation of used tires in society poses a huge environmental threat. Any practical use of used tires is an asset to society. The present invention describes a tire tube container made from inverted used tires and tools to effect the inversion.

BRIEF DESCRIPTION OF THE INVENTION

Used tires are discarded by the hundreds of millions each year even though they remain structurally functional. It is usually only the thickness of rubber on the tread section that is lacking for their continued intended use. In the present invention used tires are inverted and used singly or connected side by side to create a tubular structure of any length called a tire tube. Used singly, an inverted tire, preferably with one sidewall removed, may be sealed to the lower end of a concrete column mold for making support posts. Filled with concrete the tire tube forms the footing for the post. Joined together in multiples, a stationary tire tube may be used in many ways such as a culvert in ditches, or a fluid conduit, or as a reservoir for hazardous chemicals such as radioactive waste, or, standing upright and filled with sand, as a highway impact absorber. Laying horizontal, donut-like, the tire tube may be used as a spring. Suspended and made to rotate the tire tube can act as a tumbler to compost, and/or dry, and/or pulverize a wide range of materials.

DESCRIPTION

By inverting tires, used or new, to make a tire tube, several advantages result, including, increased internal volume, better interior wear characteristics, greater stiffness, and a pleasing external surface. Volume and stiffness are increased because the tire's molded-in cords and belts (tempered steel mesh) are tensioned in such a way that they naturally spread the tire carcass when it is inverted. The tire's hard-wearing exterior surface becomes the interior. The previously pristine interior becomes the exterior. Tools to invert tires are disclosed later.

A tire tube may be used stationary, in a horizontal or vertical position, or rotated. Although inverted tires are preferred, both inverted and non-inverted tires may be used. Non-inverted tires may have a central axle that stretches the tire tube longer between ends that may be wheels installed in the end tires for that purpose. This enlarges the tire tube volume and adds stiffness.

When the tire tube may is rotated it may be used as a tumbler for drying, pulverizing, separating, or composting. For these uses, the entry of the tire tube may have a reducer to make its hole smaller than the passageway through the tire tube. This ensures that material movement is always towards the exit end of the tire tube since the reducer prevents material from falling back out of the entry end when the tire tube is rotated. If the tire tube is inclined to the horizontal, movement from one end towards the other is enhanced.

As material is tumbled in the rotating tire tube, it advances from tire to tire. Over time the material is dried, and/or pulverized and/or composted. The time it takes depends on the speed of rotation and the angle to the horizontal. By adding sharp and tough objects, such as stones, loose screws, sheet metal pieces and the like, material may be more quickly pulverized by the milling action that such additions provide.

Steel screws or nails may be screwed through the tires from the exterior to penetrate into the tire's interior so as to cause a tearing action in the tumbling material.

Bracket-like paddles or cups attached to the inside tread of the tire tube will cause a improved tumble action similar to a clothes dryer's ribbed interior.

Screens may be placed between adjacent tires to retain material until it is reduced in size to pass through. When numerous tires are connected making a long tire tube, ever smaller mesh size of screens can be placed in sequence to achieve desired particle size at the last tire's exit hole.

A cylindrical trommel screen attached axially between any two tires, or to the last tire, and, in either case, rotating with the tire tube, allows removal of finer material anywhere along the length of the tire tube, providing separation as to size of the ground, dried, or composted material.

In more detail, defining the parts of a tire: the tread is that section that is, cylinder-shaped and which normally contacts the road; the bead rings are the two holes which hold the tire on a wheel; and the sidewall are the two flat donut shaped disc sections that connect the tread section to the bead rings Bead rings are reinforced with tempered steel-wire and are extremely strong. The bead rings hold and seal the tire to the wheel.

Connecting tire tubes together can be done in several ways: using screws through or near adjacent bead rings; by mounting two tire tubes on one wheel, one on each side of the wheel; by using a rolled cylinder with ridges on the sides that is expanded into the bead rings; with toggle bolt fasteners (like those used for dry-wall or gypsum board) which are be inserted between adjacent tires from the outside, a roll-formed channel hoop inserted to join two bead rings with screws securing this hoop to the bead rings; and, by cutting one sidewall off so that the tread portion can be spread over—and screwed to—the tread portion of an adjacent tire.

The simplest method of rotating a long tire tube, is to place it on the ground and simply push it. This least expensive method nevertheless stirs the material inside and causes the material to move from tire to tire. If the material is organic and kept moist and its passage slow, it win be composted.

Another method of rotation is to have the tire tube resting on a platform which can be tilted in a see-saw manner with limiting fences at the outsides of the board or platform, to limit travel of tire tube. By alternately raising and lowering one side of the platform or board, the tire tube is made to roll by gravity back and forth on the board or platform. In both these methods it is preferable to have the tire tube at a slight angle to the horizontal so as to assist in material transfer through the tire tube.

Yet another embodiment of a tumbler suspends the tire tube from a supporting structure such as two saw horses or a pyramid-shaped scaffold. The tire tube is suspended and rotated by at least two Vee belts which loop around the gap between adjacent tires and around a rod supported by the structure. One belt should engage a pulley on the rod, the other belt on an idler pulley. A crank handle on the rod makes the tire tube easily rotatable for back yard composting. The tire tube assembly may be tilted by using belts of different lengths.

There is a huge number of mechanical components that are available from vehicle manufacture such as wheels, axles, transmissions, differentials, bearings, and the like, with which to support and rotate tire tubes of considerable length.

Thus tire tubes can themselves be a part of a larger apparatus. For example several can be arranged in a spoke-like manner, revolving and rotating around a central hub such that feeding material to be milled or composted into the tire tubes can be from one central hub.

Another large apparatus uses a axle to support and rotate a tire wheel portions of the wheel's center are cut out to make it spoke-like to allow passage of material therethrough. The wheel's rim, designed to securely hold the proper sized tire of the tire tube, supports and rotates the tire tube which is cantilevered outwards from the axle as more and more tire tubes are added. The whole tire tube rotates with the axle. Screws may be put through the bead rings and through the wheel rim to permanently attach the two.

Another embodiment of this axle drive uses a common rear axle (including differential) from a rear wheel drive vehicle. A tubular drive shaft is attached to the axle's driving flange by welding, or by bolting using the existing wheel attachment fasteners. The outboard end of this tubular drive shaft has a normal steel wheel attached by welding or bolting. The inboard end of this tubular drive shaft may terminate at the axle's driving flange or, if large enough in inside diameter, may extend towards the differential and may be further supported on a bearing on the axle housing. Large openings are cut in the wheel's disc creating a spoke-like arrangement for the easy passage of material therethrough. Two used tires, preferably inverted, are fitted, one to each bead ring mounting surface. The outboard tire is secured solidly to the wheel while the inboard tire bead ring hole may be allowed to run on the rim acting as a seal-when the inboard tire is preferred to remain non-rotating. Additional used tires are connected to these two wheel-mounted tires using methods previously described. Obviously more used tires can be added to the outboard end, the maximum overall length determined by requirements. The outboard end of such a long tire tube may be supported on separate roller support means engaging additional wheels inserted in the long tire tube. The same tire tube structure is constructed on the other side of the vehicle rear axle. By driving the input shaft of the differential, the two tire tube structures are made to rotate at a preferred rate. This assembly is called an 'axle-driven tire tube'. The normal differential action may be avoided by welding the differential's spider gears to give positive rotation to both tire tubes. A hopper assembly covering the rear axle allows dumping large amounts of material which falls into the open inboard end of the tire tubes. Auger blades attached to the above described tubular drive shaft where it enters the first tires of the tire tube, would provide positive feed of the materials into the tire tubes. A reducing disc as above described may also be used. Adding additional such axle-driven tire tubes, with or without differentials, creates a unit of any size and capacity. Connecting the inner, hopper-covered ends of the bearing-supported tubular drive shafts with sprockets and chain, creates a low-cost drive to all rear axles from the first axle's input shaft.

Another drive method is to have the tire tube sitting between—and supported by—two parallel axles; one of which is driven. The axles can be mounted on a support structure make from construction lumber and an electric motor with belt drive to one axle. This will allow the tire tube to rotate at a desired speed—faster for milling and drying, slower for composting.

As previously described the inclusion of rocks, metal shards, wire brushes or other medium of a tough nature into the tire tube, along with the material to be milled, dried or composted, will more rapidly break down and crush the material into ever smaller particles. Screws or nails can be driven through the exterior tread and/or sidewalls (normal or inverted) such that they appear on the inside to impale, tear and puncture material tumbling therein. A spiral plastic strip attached to the separator screen is another way of moving material.

Sand, sawdust or abrasive media may be used in the tire tube to achieve a desired surface finish on materials such a stones, rough gems, metal parts, wood components, etc.

Tire tubes may be separated by plastic screens or other perforated structures including screens, having tapered perforations that are non-blocking. The screen separator may be attached to a bead ring with fasteners. The screen forces material to remain in a first tire tube(s) until it has been pulverized and/or composted to a size predetermined by the mesh size of the screen. It then passes through the screen into a next compartment for additional milling. By repeating this process in stages, an end product can be produced to a degree of fineness and/or dryness required. If the screen wire is cut in places so as to leave loose ends throughout it's area, these loose ends may be bent out of plane into the tumbling mass to further tear the material.

The screening separator can be a horizontal cone attached inside a tire tube. Half the surface a of the cone may be a screen and the other half left plain. As the cone rotates with the tire tube and when the screen surface is up, it can receive a mix of material delivered by paddles attached to the inside of the tire. These paddles may be attached opposite the screen so as to be generally above the screen when the screen is up. Material that falls through the screen portion of the cone is directed to the next tire by sliding down the lower unpierced portion of the cone. This is particularly useful for composting where larger objects should remain longer in the entry tires and fines can advance more quickly since they compost faster. The conical separator may be entirely screened in which case a half a cone, slightly longer, of smooth material such as polyethylene can be fitted inside the full screened cone. The two cones are then rotatably attached at their centers or apexes. In this way as the tire tube is turned, the smooth cone always slides to the lower portion of the screen cone where it catches material that falls through the screen. The screened material then slides down the smooth cone into the next tire.

Next is described a tool for inverting tires. This can be achieved by pulling, pushing or rolling one bead ring through the other. One embodiment of an apparatus for inverting tires comprises a platform, such as a steel plate, with a centrally located hole of about the size of the bead ring of the tire to be inverted and a cone concentric with and enlarging from below the hole. The cone and platform rests on the horizontal tire below. A tripod on the platform supports a pulling means such as a hoist that connects via steel cable or chain through the platform hole to the lower bead ring of the tire below. Clamps or piercing hooks may be used to connect the cable to the bead ring. As the lower bead ring is raised towards the platform, the cone compresses the tire inwardly. In this way the lower bead ring of the tire is pulled through the hole in the platform first. In place of the steel cable or chain, one may use solid links such as found on a bearing puller. These solid links are hinged from a central hub and may be 'L' shaped. When drawn up, the leg of the 'L' below the hole are forced to close inwards compressing the lower bead ring as the links and bead ring are drawn up through the hole.

Another embodiment uses ring clamps made of short sections of steel tubing of a circumference close to the distance about the tire from bead ring to bead ring. They are slit and prepared to accept a welded-in clamp or made with a screw through the center of the ring to make a clamp of itself. Three or more of these are attached to the lower bead ring. A tripod (or quadra-pod etc.) sits on the upper bead ring clamped thereto or with pointed ends that pierce through the tire just inwardly of the steel wire of the bead ring. A pulley is attached to each tripod leg. One or more hoist(s) depends from the tripod with cables that are directed by the respective pulley to the opposite side of the tire. The cable extends outwards across the tire's top sidewall, around and down the outside of the tire tread and inwardly across the bottom sidewall and finally wrapping- around the entire ring clamp to which it is secured close to the bead ring. As the hoist draws up the cable the tripod legs are pulled together and down, radially compressing and pushing down, the upper bead ring. Simultaneously, the cables rotate the ring clamps that, in turn, rotate the lower bead ring and, in so doing, roll the tread and sidewalls inwards and upwards around the upper bead ring thus inverting the tire.

BRIEF EXPLANATION OF THE DRAWINGS

FIG. 1 A cross section view of a standard wheel with mounted tire;

FIG. 2 A side view of the standard wheel and tire;

FIG. 3 A cross section view of a tire tube comprised of three wheels and two tires;

FIG. 4 A longer embodiment of the tire tube;

FIG. 5 Perspective of a connecting hoop to join tires at the bead ring;

FIG. 6 A cross section of a tire tube made from inverted tires with ancillary hardware for composting FIG. 7 A perspective of a back-yard composter suspended from a simple support;

FIG. 8 Another embodiment of this composter;

FIG. 9 A side view in partial cross section of an axle driven tire tube with feed hopper and auger and further showing two drive methods, one on the left half of the drawing, the second on the right half;

FIG. 10 A top view of this embodiment showing multiple units driven from a single source;

FIG. 11 A rendition of a large tire tube structure with a truck dumping material for processing in the tire tubes;

FIG. 12 A tool for inverting tires.

FIG. 13 Shows a cone with half being perforated and the other half solid to separate and advance finer materials;

FIG. 14 Is a conical screen with a half cone of solid surface inside, attached at their apexes;

FIG. 15 An embodiment for continuous turning on two axles.

FIG. 16 An embodiment of a fastener for assembly and disassembly anywhere along the length of a tire tube.

DESCRIPTION OF DRAWINGS

Figure 17:
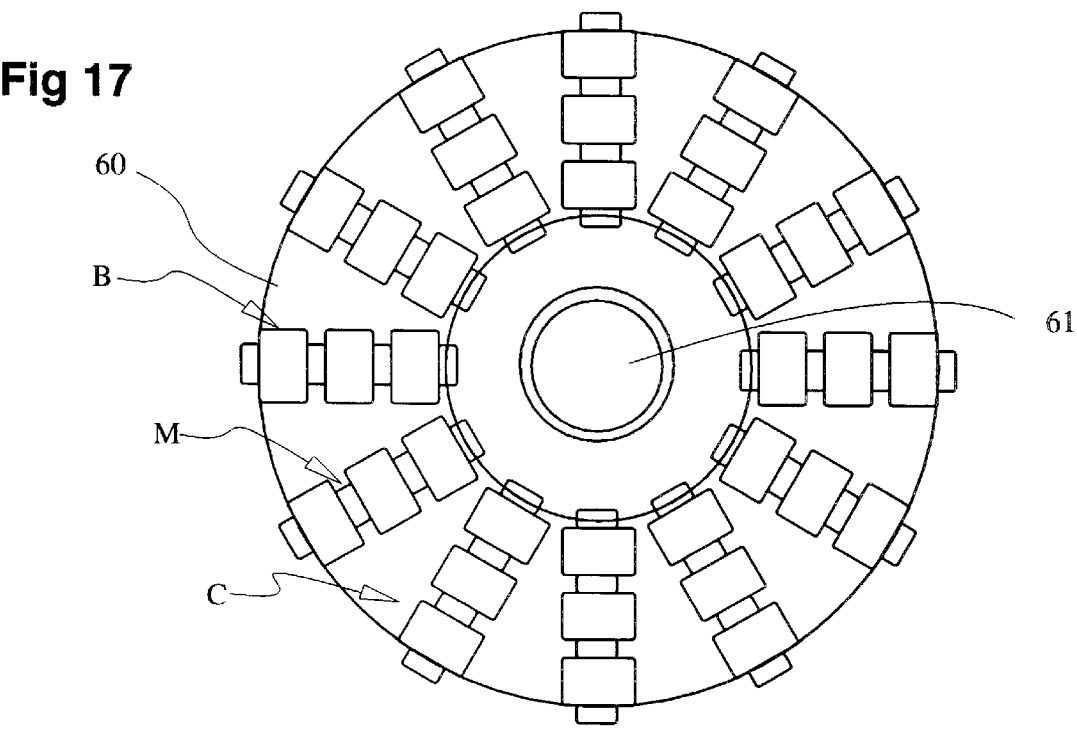
FIG. 17 A plan view of an embodiment where the tire tubes are arranged on a turntable all depending and driven from a central hub where the material to be processed is dumped.

In all FIGS. the used tire A has a tread section 1, two sidewalls 7 and two bead rings 3. The wheel M, on which such a tire mounts and seals to, has an shaped outer rim 5 on which the tire is mounted and is retained on the rim 5 by flange 5a, and, the wheel has a center disc 2 for attachment to an axle. The disc 2 usually contains openings 8, which may be in the form of spokes, and a central hole 4. In FIG. 3 is shown two used tires A mounted on three wheels M, thereby connecting all three tires A together. The center wheel M has disc 2 removed. One tire A is mounted on one rim 5 by one bead ring 3 such that the second bead ring of tire A is attached to a second wheel M. This is one embodiment of a tire tube C. In FIG. 4 is shown a longer version of this embodiment with a central axle 10 extending through several wheel center holes 4. The resulting tire tube is spread apart longitudinally with collars 11 and spreader rods 9 thereby providing additional interior space. In FIGS. 1, 3 and 4 the tires A are not inverted and thus are shown in FIGS. 1 and 3 with the bead ring having little spread therebetween.

In FIG. 6 is shown the inverted tire B, an effect of which is to cause the bead ring 3 to spread apart from the naturally occurring internal tensions created in the inverted tire. This adds useful internal volume without the necessity of the central axle 10 and collars 11 as shown in FIG. 4. In FIG. 5 is shown a connector hoop 12 with connecting link 13 and connector bolts 14. The hoop 12 is compressed radially to allow inserting onto two adjacent bead rings 3 which engage into the channel of the hoop 12. After positioning the hoop 12 the link 13 is screwed into place locking tires B together. In FIG. 6 is shown in cross section hoop connector 13 as well as other connecting means such as self tapping screws 18, toggle bolt 15 and inverted wing nut 70 with bolt 72 and washer 71. Also shown in FIG. 6 is the opening reducer 17 at the entry end of the tire tube C and a more sanitary opening reducer means in the form of a tapered cylindrical tub 16 with opening reducer 17. The tub 16 provides a stand-off distance from the entry to the tire tube C. The tapered shape of this tub allows it to be a sealed fit into bead ring 3. Screws anchor the reducer 17 to the bead ring 3.

FIG. 7 shows a supporting structure 20 on legs 22 assembled from common lumber to suspend a tire tube from vee belts 24 wound around both the tire tube and a pulley on crank rod 23. Opening reducer 16 in FIGS. 7 and 8 provides a sanitary opening to add kitchen waste and the like. FIG. 8 shows another embodiment of a supporting structure comprising legs 22 and cross pieces 25 on which the crank rod 23 rests. A nail plate 26 connects the legs 22 into a pyramid form.

Another embodiment of the tire tube C is shown in FIGS. 9, 10 and 11. This embodiment is suitable for industrial use where large quantities of material are to be processed such as composting barn cleanings from farming or for grinding used building materials such a roofing. The low-cost and simplicity allows them to be widely used and built on site. As shown in FIG. 11 a truck R is dumping a load of material onto a hopper fabricated on the extended chassis of a truck F that serves as the power source. This arrangement allows the engine heat from the radiator and the exhaust to be ducted into the hopper's sealed supporting base, using normal engine cooling fans, and into the tire tubes C for drying or heating the materials tumbling therethrough. In FIG. 9 is an end view of such a large unit and FIG. 10 a top view with material D sitting above hopper 36 and falling on the angled sides into auger 34 which advances material D into rotating tire tube C. On the left half of the drawing is shown one method of constructing such a powered tire tube where a vehicle rear axle 38 is driven from an electric motor 35 or from a drive shaft 31 shown truncated. In FIGS. 9 and 10 this embodiment is shown with two different drive methods, one on the right the second on the left. On the right is shown a large diameter tubular drive tube 40 attached to the drive flange 42 of axle 38. Inboard support bearing 31 stabilizes the tubular shaft 32. Wheel M attached to tubular shaft 40 drives tire tube C. Wheel M has openings 8 in wheel center disc 2 to allow easy passage of material D into outboard tire tube C. The axle 38 is driven by a regular drive shaft 31 from a regular transmission and motor of truck F.

On the left side of FIGS. 9 and 10 is shown another method of using axle 38 where solid drive shaft 41 is attached to axle drive flange 42 and in turn has a wheel M attached outboard to support and rotate tire tube C. With this embodiment a motor 35 with sprocket drives roller chain 33 which, in turn, drives sprockets 37 on each axle 38. In this embodiment the differential drive is pointed upwards instead of horizontally as shown in FIG. 9. In FIG. 9 both drive methods are shown on the same axle 38 with sprocket 37 and drive shaft 31. FIG. 10 shows one of the six tire tubes C having trommel screen P attached so as to rotate with the tire tube and allow both early and final separation of tumbling material.

Figure 18:
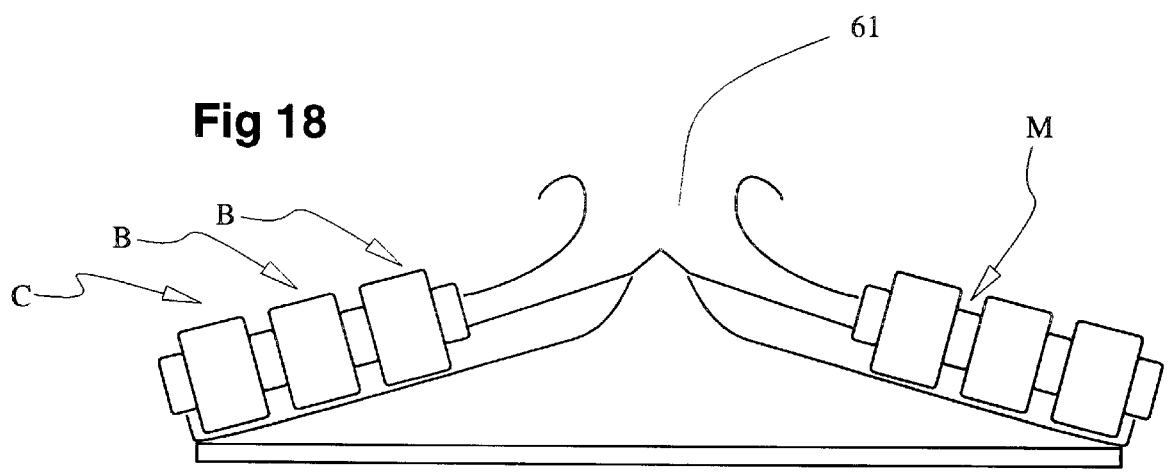
FIG. 18 A side view of the same embodiment.

FIGS. 17 and 18 show another embodiment of a large-scale tire tube apparatus designed about a central hopper 61. Tire tubes C sit on and revolve around platform 60.

FIG. 15 shows an axle driven tire tube where the axle's outer circumference drives the tire tube directly allowing continuous rotation from an electric motor (not shown). Supports 66 hold axles 64 and 65 with axle 65 connected to drive means which may be solar powered, electric, manual or any other convenient drive system.

In all embodiments where sizing of the final material E from the exit of the tire tube is important, FIG. 13 shows a conical screen separator 19 where half is non perforated. Final material E runs down the smooth solid surface 52 after passing through screen surface 51. Small end 53 is arranged to face the entry side of the tire tube. Large end 50 is connected to the tire bead ring 3. FIG. 14 shows another embodiment comprising a fully screened cone 51 and a solid cone portion 52a which rotates within this screened cone under gravity. The cones are connected together at their apexes with a fastener such a nut and bolt which will allow relative rotation of the cones as the tire tube is rotated. Material small enough to pass through the screen's holes is collected and directed by solid cone portion 52a into the next tire.

FIG. 12 shows a tire inverting apparatus with circular plate 55 with tripod 61. Cone 56 compresses the tire A as it is pulled. Hoist means 60 pulls cable 59 connected to hub 58 which has solid or flexible links 57. If solid, links 57 are hingedly connected to hub 58 and can be brought together by sliding ring 62 downwards. Hoist connects at 63 to bead ring 3 with fastener means such as strong clamps or nuts and bolts or piercing hooks. Hoisting causes lower bead ring 3 to compress radially inwards and pass through the upper bead ring thus inverting the tire.

FIG. 16 shows a nut, bolt and washer arrangement that can be inserted and removed from the exterior of the tire tube and at any place along its length. Inverted wing nut 70 has threaded hole 72 into which threads bolt 72 with washer 71. The washer 71 forces the bead rings against inverted wing nut 70. The inverted wing nut 70 may have various cross sectional shapes such as channel or half round.

FIGS. 17 and 18 show tires A connected with rim 5 into a spoke-like arrangement about a central hub 61 into which is dumped material to be processed in the tire tubes. Platform 60 is made to rotate to cause the tire tubes to revolve merry-go-round style.

Figure 19:
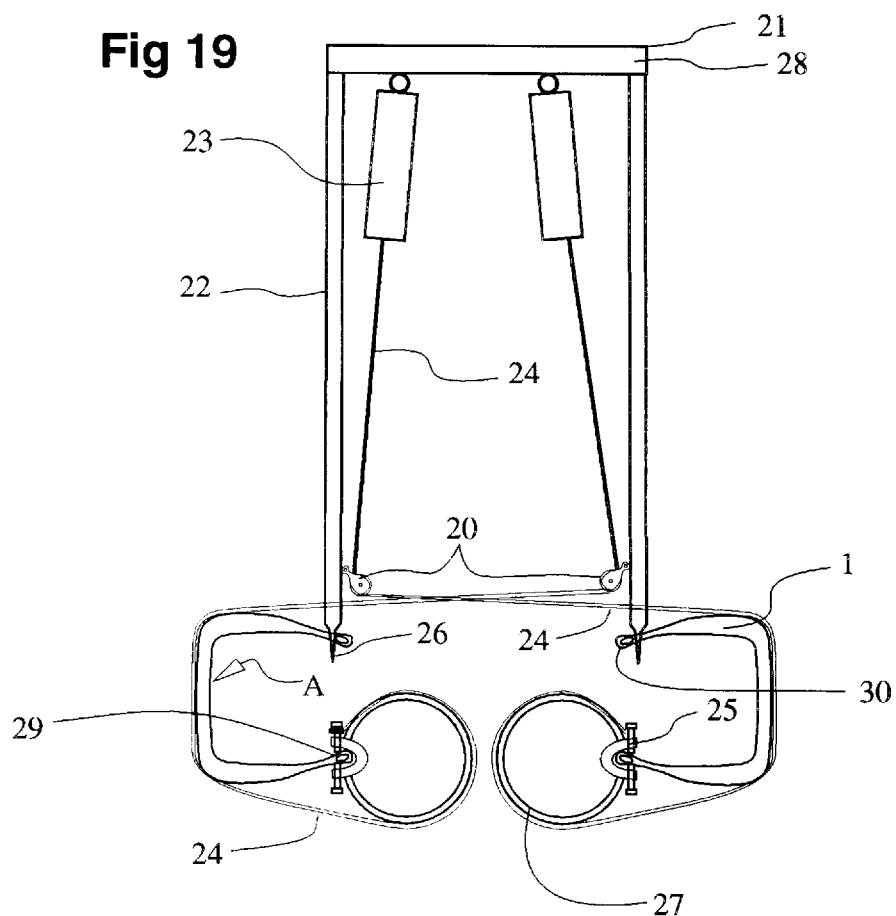
FIG. 19 A side view of a roller tire inverter.
Figure 20:
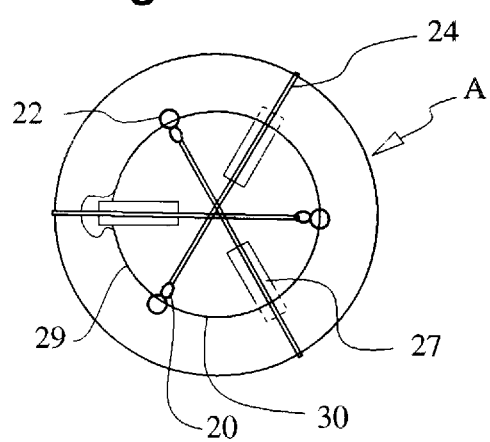
FIG. 20 A top view of the same inverter.

Referring to FIGS. 19 and 20 this inverter embodiment uses rings 27 made of short sections of steel tubing that have a clamp 25 to attach to the bead ring 29. Three or more of these rings 27 are attached to the lower bead ring 29. A tripod 22 sits on the upper bead ring 30 clamped thereto or with piercing ends 26. A pulley 20 is attached to each tripod leg 22. One or more hoist 23 means depend from the tripod header 21 which are hingedly connected at 28 and separates into three cables 24 that are directed by respective pulley 20 to the side opposite its tripod leg 22 to wrap around the ring clamp 27. The cable 24 first extends across the tire's top sidewall, around the outside of the tire tread and across the lower sidewall to finally wrap around the opposing ring clamp 27 to which it is secured at the clamp 25. As the hoist 23 draws up the cable 24, the tripod legs 22 are drawn inwardly and downwardly which pushes the upper bead ring 30 inwards and downwards while the cable 24 and ring clamps 27 roll the lower bead ring 29 and tread and sidewalls upwards around the descending upper bead ring 30 hole thus inverting the tire A.

I claim:

1. A container comprising at least first and second tires, each of said tires having a tread portion with a normally exterior facing surface, first and second bead rings, and first and second sidewalls extending between said tread portion and said first and second bead rings respectively, each of said tires being inverted such that said normally exterior facing surface of said tread portion faces inwardly, and means for retaining said tires in a generally side by side relationship with said second bead ring of said first tire being located proximate said first bead ring of said second tire.

2. The container of claim 1 wherein said means for retaining said tires in a side by side relationship includes means for retaining said second bead ring of said first tire in a substantially abutting relationship with said first bead ring of said second tire.

3. The container of claim 1 wherein said means for retaining said tires in a side by side relationship includes means for securing said second bead ring of said first tire to said first bead ring of said second tire to maintain said bead rings in a spaced relationship to thereby enlarge an interior volume of each of said tires.

4. The container of claim 3 wherein said means for retaining said tires in a side by side relationship comprises ring clamps for securement to said bead rings.

5. A container comprising a plurality of used tires, each of said tires having a tread portion with a normally exterior facing surface, each tire having first and second sidewalls extending from said tread portion, each of said tires being inverted such that said normally exterior facing surface of said tread portion faces inwardly, said tires being secured in a generally side by side relationship with adjacent sidewalls of adjacent tires being secured together.

6. An apparatus for treating material comprising at least first and second tires, each of said tires having a tread portion with a normally exterior facing surface, first and second bead rings, and first and second sidewalls extending between said tread portion and said first and second bead rings respectively, each of said tires being inverted such that said normally exterior facing surface of said tread portion faces inwardly, means for retaining said tires in a generally side by side relationship with said second bead ring of said first tire being located proximate said first bead ring of said second tire, and means for rotating said inverted tires.

7. The apparatus of claim 6 wherein said inverted tires are arranged in a generally sloping angle to the horizontal such that upon rotation, material will pass from said first tire to said second tire.

8. The apparatus of claim 7 wherein said inverted tires further include milling media within said inverted tires to aid in pulverizing material.

9. The apparatus of claim 6 further including screening means between said first and second tires.

\* \* \* \* \*